United States Patent [19]
Robinson

[11] 3,745,852
[45] July 17, 1973

[54] GENEVA TYPE MECHANISM FOR USE IN CLOCK TIMER OR THE LIKE

[75] Inventor: Ralph C. Robinson, Mooresville, N.C.

[73] Assignee: General Time Corporation, Stamford, Conn.

[22] Filed: Dec. 22, 1970

[21] Appl. No.: 100,763

Related U.S. Application Data

[62] Division of Ser. No. 863,886, Oct. 6, 1969, Pat. No. 3,597,918.

[52] U.S. Cl. .................................................. 74/436
[51] Int. Cl. ............................................ F16h 55/04
[58] Field of Search .................................... 74/436

[56] References Cited
UNITED STATES PATENTS

| 442,404 | 12/1890 | Steiger | 74/436 |
|---|---|---|---|
| 2,345,139 | 3/1944 | Martin | 74/436 |
| 3,248,953 | 5/1966 | Holper et al. | 74/436 X |
| 3,485,965 | 12/1969 | Bleibtreu et al. | 74/436 X |

FOREIGN PATENTS OR APPLICATIONS

| 949,212 | 8/1949 | France | 74/436 |

*Primary Examiner*—Leonard H. Gerin
*Attorney*—Edmonds, Taylor, Laist, Seagraves, Lawrence et al.

[57] ABSTRACT

A geneva type mechanism in which a pin in a circular orbit engages radial notches in an indexed member to produce indexing advancement. A locking member, in the form of a polygon having escalloped sides and arranged flatly adjacent the indexed member, engages a locking disc associated with the pin. The indexed member has spokes between the notches extending radially for blocking engagement by the pin for bracing the indexed member against the effect of reversely applied torque to prevent jamming of the mechanism which tends to occur just prior to and following the indexing stroke.

4 Claims, 5 Drawing Figures

PATENTED JUL 17 1973 3,745,852
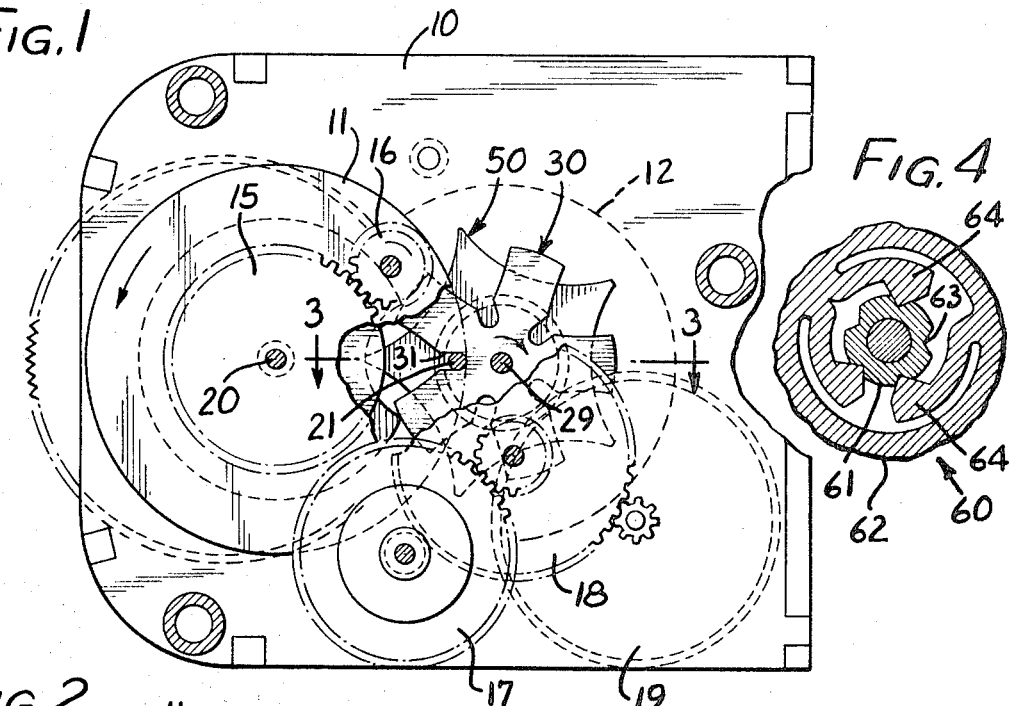
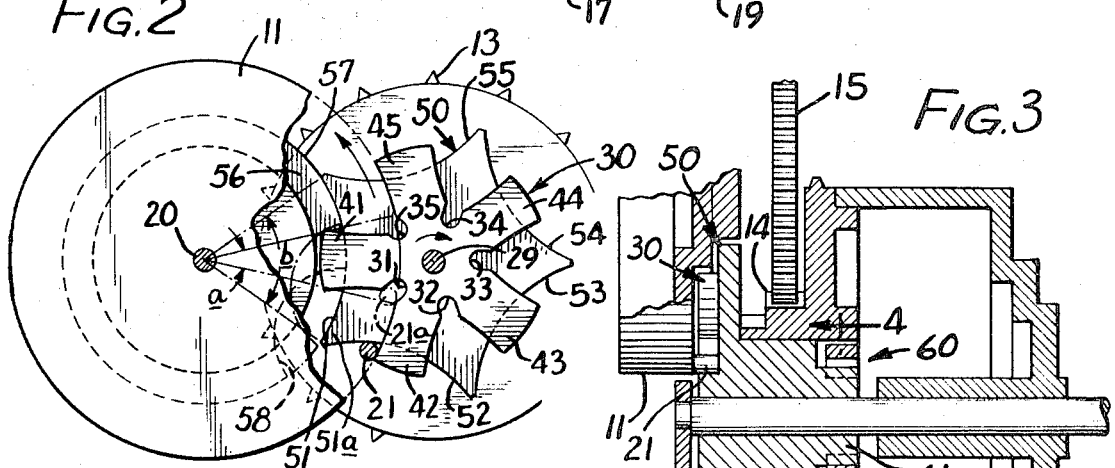
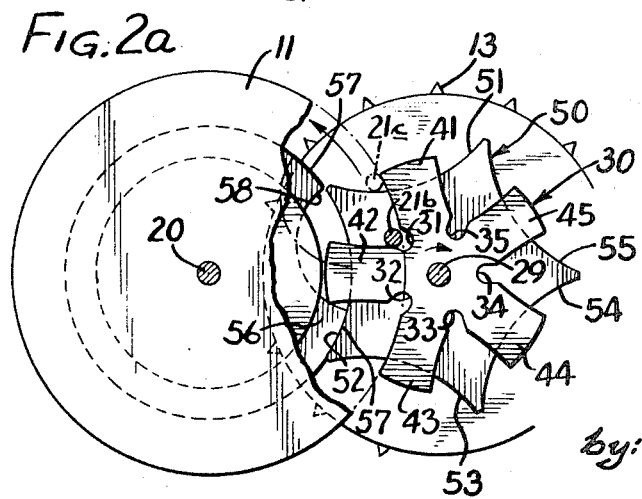
INVENTOR
RALPH C. ROBINSON
by: Wolfe, Hubbard, Leydig,
Voit & Osann, Ltd. ATTYS.

GENEVA TYPE MECHANISM FOR USE IN CLOCK TIMER OR THE LIKE

This application is a division of my copending application Ser. No. 863,886, filed Oct. 6, 1969, now U.S. Pat. No. 3,597,918, dated Aug. 10, 1971.

A geneva mechanism conventionally has a rotating input element which steppingly drives, or indexes, an output element or start wheel. The input element is usually in the form of a stepping pin which comes into successive register with radial notches in the output element, the latter being advanced during the time the pin is engaged with a notch. For the purpose of locking the output element against rotation during the remainder of the time, the input element carries a locking disc which mates edgewise with scallops between the radial notches in the star wheel, the disc having an arcuate relief in the region of the pin for clearing the points of the star wheel. The angle of the input element which is subtended by one of the scallops in the star wheel is commonly referred to as the "locking angle." The wider the locking angle, the better the output element is locked against rotation by reversely applied torque in the intervals between successive indexing movements.

The angular movement which must be made by the input element to secure a step of indexing movement of the start wheel is referred to as the "indexing angle." In many of the devices which use a geneva type mechanism it is desired to have the indexing movement completed in a short space of time. For example, in a digital clock having adjacent drums or tapes for indicating seconds, minutes, tens of minutes, hours, and tens of hours in successive order it is desirable to have the minutes digit remain fixed in the viewing window during most of the minute interval, with rapid indexing to the next minute digit upon completion of a single rotation of the "seconds" drum. In other words, when a period of sixty seconds is up there should, ideally, be prompt and rapid switching to the next minute digit. This minimizes the time interval during which portions of two adjacent minute digits are visible through the viewing window. This rapid changeover can be accomplished by designing the star wheel to produce a minimum indexing angle, which is done by shortening the radial notches. This involves reducing the size of the scallops which reduces the locking angle. The smaller the locking angle becomes, the greater is the possibility that jamming may occur between the input and output elements upon application of reverse torque, particularly just prior to, and just following, the indexing stroke.

Accordingly, it is an object of the present invention to provide a geneva type mechanism which is distinguished by a small indexing angle, to secure rapid indexing or changeover of the output element, combined with a large locking angle so that the output element is reliably locked between successive indexing movements. It is a related object to provide a geneva type mechanism which is particularly well suited for use in clocks, which provides rapid changeover of the indication in each of the ordinal positions, and which minimizes the time during which portions of adjacent digits are simultaneously visible through a viewing window, thereby making the digital indication more easily and consistently readable.

It is another object of the invention to provide a geneva type mechanism for a clock or the like which requires only a small amount of driving torque and which is nevertheless highly reliable avoiding any possibility of jamming between the driving and driven elements even where such elements are of low precision and intended for use in digitally indicating clocks intended to sell at a low price.

It is yet another object of the invention to provide a geneva type mechanism which is distinguished by the features mentioned above but which is of simple construction and capable of being molded in plastic at a cost which does not substantially exceed the cost of molding geneva elements of more conventional design.

Other objects and advantages of the invention will become apparent upon reading the attached detailed description and upon reference to the drawing in which:

FIG. 1 is an elevational view, in partial section, showing a portion of a digital clock mechanism employing a geneva mechanism constructed in accordance with the present invention.

FIG. 2 is a fragmentary view based upon FIG. 1 and showing the parts prior to an indexing stroke.

FIG. 2a shows the parts following an indexing stroke.

FIG. 3 is a fragmentary horizontal section looking along the line 3—3 in FIG. 1.

FIG. 4 is a detailed section showing the "friction" associated with the geneva output element and looking along the line 4—4 in FIG. 3.

While the invention has been described in connection with a certain preferred embodiment, it will be understood that I do not intend to be limited to the particular embodiment shown but intend, on the contrary, to cover the various alternative and equivalent forms of the invention included within the spirit and scope of the appended claims.

Turning now to the drawing FIG. 1 shows a frame plate 10 forming a part of a clock of the digitally indicating type which is shown and described in some detail in U.S. Pat. No. 3,597,918 which issued on Aug. 10, 1971. The clock includes a seconds drum 11 having means (not shown) for rotating it on a 60 second cycle and a minutes drum 12 having sprockets 13 for driving a tape (not shown) carrying minute digits and requiring indexed advancement, or changeover, from one digit to the next upon completion of a cycle of rotation of the seconds drum. Meshing with a circular rack 14 on the drum is a setting wheel 15. As described in the above mentioned application, the clock includes a timer to turn a radio on at a predetermined time and performs other functions requiring the gears and pinions 15–19 which do not per se form a part of the present invention.

In accordance with the present invention an improved geneva type mechanism is provided between the seconds drum 11 and the minutes drum 12 having an input assembly and an output assembly, the input assembly including a stepping pin which moves about a circular orbit and which cooperates with shallow radial notches in an indexed member which forms a part of the output assembly, successive passes of the pin serving to produce successive indexing movements at the output. Arranged adjacent to, and flatly adjacent, the indexed member is a locking member in the form of a polygon having escalloped sides. In the plane of the polygon, and mating with it, is a locking disc having a radius which is substantially less than the radius of the pin and which is relieved in the region of the pin to provide clearance for the advancing point of the polygon during indexing movement, the indexed member being provided with radial spokes interposed between the notches for presenting lateral surfaces which cooperate with the pin for bracing the indexed member against rotation during the intervals immediately preceeding and immediately following the indexing stroke.

Referring to the drawing, the input assembly 11 is rotatable about an axis 20 and carries at its periphery a short pin 21 which is oriented parallel to the axis. Arranged in the plane of the pin, and rotatable about an axis 29, is an indexed member 30 having station notches 31–35 with interposed spokes 41–45. Arranged flatly adjacent the indexed member and preferably molded integrally with it is a locking member 50 in the form of a polygon having escalloped sides 51–55 respectively which have a minimum radius which is substantially greater than the maximum radius of the notches 31–35. Centered about the axis 20 and lying in the plane of the locking member 50 is a locking disc 56 having an edge 57 of such diameter as to lockingly mate, edgewise, with the scallops, the disc being arcuately relieved in a region 58 which is centered with respect to the pin 21, thereby to provide clearance for passage of the points on the locking member 50 as the indexed member and locking member are jointly indexed, in the present instance in a clockwise direction.

For the purpose of coupling the indexed member 30 and the locking member 50 to the drum 12 to enable the drum to be rotated independently incident to setting the clock, a "friction" 60 is provided having an input element 61 and an output element 62. The input element has a plurality of outwardly presented notches 63 as shown in FIG. 4 engaged by spaced detents 64 which are molded integrally with the wall of the drum. It will be apparent that when the output assembly, formed of the indexed member 30 and locking member 50, are held stationary, rotation of the drum by the setting wheel 15 will be accompanied by idle clicking of the detents in the notches. However, during normal running of the clock, the coupling provided by the detents 64 and notches 63 will serve to advance the drum 12 in unison with the indexed and locking members 30, 50.

The operation of the geneva mechanism will be apparent upon considering FIGS. 2 and 2a which show the condition of the mechanism just prior to and just following an indexing stroke. Thus in FIG. 2 the stepping pin 21 secured to the seconds drum 11 is shown approaching the shallow notch 31 in the indexed member. It will be noted that as the pin advances, the output assembly is locked in stationary position by reason of the engagement between the periphery 57 of the locking disc and the scallop 51 and also by contact between the pin 21 and spoke 42. As the pin 21 traverses the position 21a where it engages the notch 31, the indexed member 30 is indexed forwardly through one fifth of a revolution, with the point 51a of the locking member sweeping through the relief 58, until, at the time that the pin is ready to leave the notch 31, the scallop 52 is presented to the periphery 57 of the locking disc. During the period of time immediately after the indexing movement, that is, as the stepping pin moves from position 21b to the position 21c (FIG. 2a), the pin is in blocking engagement with the spoke 41. The indexed member 30 and the rest of the output assembly thereafter remains locked in position until such time as the stepping pin 21 may again come into the active position shown in FIG. 2.

The locking function of the pin 21 with respect to the spokes of the indexed member is considered to be particularly significant since the blocking of a spoke occurs, both prior to and after the indexed advancement, at a time when the scallop is only partially occupied by the periphery 57 of the locking disc, the remainder of the scallop being unblocked adjacent the relief 58.

As a result of employing notches 31–35 which are extremely shallow and which have a short radius, the index angle, indicated at a in FIG. 2, is extremely small. That is to say, indexing of the output assembly, and changeover of the minute numerals by the output assembly, occurs promptly so that there is only a small time interval during which portions of adjacent minutes digits are simultaneously in view.

It may be noted in the present construction that, unlike conventional geneva mechanisms, the locking angle does not correspond to the indexing angle. Instead, the locking angle, indicated at b, is on the order of three times the indexing angle a. The indexed member 30 and locking member 50 are held rigidly in position without any possibility of the jamming which may occur using locking surfaces of lesser extent. Using the present locking arrangement the reaction torque exerted by the detents in the "friction" 60 during manual setting of the clock is easily resisted.

While the reduction in indexing angle permitted by the present invention might be thought to require a correspondingly greater torque and a more peaked load cycle, it is found that plastic elements, shaped as described, are readily driven by the usual low power motor employed in an electric clock even where liberal tolerances are permitted in the manufacture of the individual parts.

While the improved mechanism has particular advantage in clocks where driving torque is small and where setting forces, through a "friction," are relatively large, giving rise to the possibility of jamming, it will be apparent to one skilled in the art that the invention is not limited to use in clocks but has general application wherever a geneva type advancement may be required and especially where forces tending to drive the mechanism backwardly may be encountered.

I claim:

1. In a geneva mechanism for rotationally indexing members of successive order, the combination comprising, a rotatable input member having a short pin oriented parallel to the axis and transported in circular orbit as well as a disc adjacent the plane of the pin and which is relieved in the vicinity of the pin, a rotatable output assembly having an indexed member in the plane of the pin for engagement thereby and an adjacent locking member, the locking member being in the form of an escalloped polygon presenting arcuate edge portions for engaging the periphery of the disc tending to prevent relative rotation of the output assembly between intervals of indexing, the indexed member having short radial station notches in the vicinity of the axis for rapid indexing engagement by the pin and having radially extending spokes interposed between the notches presenting lateral surfaces for engaging the pin and thus positively blocking rotation of the output assembly during the intervals immediately preceding and immediately following the indexing stroke of the pin.

2. In a geneva type mechanism for producing rotational indexing movement, the combination comprising a rotatable input member having a short pin oriented parallel to the axis of rotation and transported in circular orbit, the input member having a disc adjacent the plane of the pin and which is relieved in the vicinity of the pin, a rotatable output assembly having an indexed member in the plane of the pin for engagement thereby and a locking member, the indexed and locking members being arranged side by side in adjacent planes, the locking member being in the form of a polygon presenting arcuate sides of escalloped profile mating with the periphery of the disc thereby tending to prevent relative rotation of the output assembly between intervals of indexing, the indexed member having short radial station notches extending close to the axis of rotation for rapid indexing by the pin and having radially extending spokes interposed between the notches presenting lateral surfaces for engaging the pin and thus positively blocking rotation of the output assembly during the intervals immediately preceeding and immediately following the indexing stroke of the pin.

3. The combination as claimed in claim 2 in which the locking angle subtended by a side of the polygon substantially exceeds the indexing angle subtended by adjacent station notches.

4. The combination as claimed in claim 2 in which the escalloped sides have a minimum radius which is substantially greater than the maximum radius of the notches.

* * * * *